US012331587B1

(12) United States Patent
Flannery et al.

(10) Patent No.: US 12,331,587 B1
(45) **Date of Patent: *Jun. 17, 2025**

(54) GATED BARRIER WITH VISUAL INDICATOR

(71) Applicant: Regalo International, LLC, Burnsville, MN (US)

(72) Inventors: Mark A. Flannery, Longboat Key, FL (US); Gary T. Schultze, Savage, MN (US); Luke J. Duininck, Richfield, MN (US); Kyle J. Willette, Savage, MN (US); Matthew A. Willms, Woodbury, MN (US); Timothy C. Daggy, Shakopee, MN (US); Kasey L. Pipo, Elko New Market, MN (US); William D. Butterfield, River Falls, WI (US); Michael P. Lane, Chaska, MN (US)

(73) Assignee: Regalo International, LLC, Longboat Key, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/382,501

(22) Filed: Oct. 21, 2023

Related U.S. Application Data

(63) Continuation of application No. 17/384,692, filed on Jul. 23, 2021, now Pat. No. 11,802,439, which is a continuation of application No. 16/258,493, filed on Jan. 25, 2019, now Pat. No. 11,072,973.

(60) Provisional application No. 62/623,522, filed on Jan. 29, 2018.

(51) Int. Cl.
*E06B 9/00* (2006.01)
*E05B 65/00* (2006.01)
*E06B 9/04* (2006.01)
*E06B 11/02* (2006.01)

(52) U.S. Cl.
CPC ............ *E06B 9/04* (2013.01); *E05B 65/0007* (2013.01); *E06B 11/022* (2013.01); *E06B 2009/002* (2013.01)

(58) Field of Classification Search
CPC .. E06B 9/04; E06B 11/022; E06B 2009/0002; E05B 65/0007; E05B 65/0014
See application file for complete search history.

(56) References Cited

U.S. PATENT DOCUMENTS 2,225,436 A 12/1940 Lang
4,628,635 A 12/1986 Maillard
5,575,353 A 11/1996 Cafaro
6,178,693 B1 1/2001 Hunt
6,308,462 B1 10/2001 Andersen
7,152,372 B2 12/2006 Cheng
8,713,851 B2 * 5/2014 Flannery ................ E06B 11/04 49/55
9,151,108 B1 10/2015 Flannery et al.
9,279,284 B1 3/2016 Axelrod
9,394,726 B1 7/2016 Flannery et al.
(Continued)

FOREIGN PATENT DOCUMENTS

GB 2317637 A 4/1998

*Primary Examiner* — Marcus Menezes

(57) ABSTRACT

The present gated barrier includes a visual indicator to show the end user one or more features of the gate barrier such as how to set up the gated barrier, whether the frame of the barrier is true and square, or whether the barrier frame has been set up with sufficient pressure between, for example, two door jambs.

2 Claims, 14 Drawing Sheets

(56) References Cited

U.S. PATENT DOCUMENTS

| | | | |
|---|---|---|---|
| 9,874,055 | B1 | 1/2018 | Flannery |
| 9,874,056 | B1 | 1/2018 | Flannery et al. |
| 9,982,479 | B1 | 5/2018 | Flannery et al. |
| 10,914,099 | B2 * | 2/2021 | Gentil ..................... E05F 1/063 |
| 2001/0025545 | A1 | 10/2001 | Rogers |
| 2003/0009945 | A1 | 1/2003 | Cheng |
| 2006/0175028 | A1 | 8/2006 | Askinasi |
| 2006/0207180 | A1 | 9/2006 | Cheng |
| 2008/0202047 | A1 | 8/2008 | Flannery |
| 2009/0293363 | A1 | 12/2009 | Flannery |
| 2012/0055092 | A1 | 3/2012 | Boucquey |
| 2013/0125470 | A1 * | 5/2013 | Dunn ........................ E06B 9/04 49/504 |
| 2013/0160365 | A1 | 6/2013 | Flannery |
| 2016/0245381 | A1 | 8/2016 | Birkert |
| 2016/0245501 | A1 | 8/2016 | Dunn |
| 2017/0058594 | A1 | 3/2017 | Marsden |
| 2017/0067284 | A1 | 3/2017 | Wang |
| 2017/0350165 | A1 | 12/2017 | Schort |
| 2019/0234139 | A1 | 8/2019 | Flannery |
| 2022/0268095 | A1 | 8/2022 | Wang |

* cited by examiner

GATED BARRIER WITH VISUAL INDICATOR

This application is a continuation of U.S. patent application Ser. No. 17/384,692 filed Jul. 23, 2021 (U.S. Pat. No. 11,802,439 issued Oct. 31, 2023) and claims the benefit thereof under 35 U.S.C. § 120, which application is a continuation of U.S. patent application Ser. No. 16/258,493 filed Jan. 25, 2019 (U.S. Pat. No. 11,072,973 issued Jul. 27, 2021) and claims the benefit thereof under 35 U.S.C. § 120, which application claims the benefit under 35 U.S.C. 119(e) of U.S. Provisional Patent Application No. 62/623,522 filed Jan. 29, 2018, all of which applications are hereby incorporated by reference in their entireties into this application.

FIELD OF THE INVENTION

The present invention relates to a barrier having a gate, and more particularly relates to a gated barrier having a visual indicator to show the end user one or more structural or functional features of the gated barrier.

BACKGROUND OF THE INVENTION

A gated barrier is often a pressure apparatus that holds itself upright or in place between two vertical surfaces, such as two door jambs, by pushing out against the two vertical surfaces. A first amount of pressure may be more than sufficient for holding up the weight of the gated barrier. A second amount of pressure, greater than the first amount of pressure, may be more than sufficient for keeping the gated barrier upright and in place when the gate of the gated barrier is opened and closed. A third amount of pressure, greater than the first and second amount of pressure, may be more than sufficient for securing the gated barrier in its position even when kicked hard by an indoor baseball player over-sliding home plate and hitting the back stop, i.e., the gated barrier.

SUMMARY OF THE INVENTION

A feature of the present invention is the provision in a gated barrier, of a visual indicator showing that an oblique standard has been moved into a right angle relationship with a threshold.

Another feature of the present invention is the provision in such a gated barrier, of a frame, where the frame includes a threshold, where the frame includes a first standard extending upwardly from the threshold, and where the frame includes a second standard extending upwardly from the threshold, of a gate in the frame between the first and second standards, of the first standard being set at a right angle relative to the threshold, of the second standard being set at an oblique angle relative to the threshold at a first time, the second standard being set at a right angle relative to the threshold at a second time, and of a visual indicator apparatus on at least one of second standard and gate that shows that the second standard has been set at a right angle relative to the threshold.

Another feature of the present invention is the provision in such a gated barrier, of the visual indicator apparatus including a first vertically extending pin on the gate and a second vertically extending pin on the second standard, where the first and second vertically extending pins are laterally offset at the first time and laterally aligned at the second time.

Another feature of the present invention is the provision in such a gated barrier, of the visual indicator apparatus including a receiver on one of the second standard and gate and a slide on the other of the second standard and gate, where the receiver includes an opening and the tongue includes a mark, where the mark is offset from the opening at the first time, and where the mark appears visible in the opening at the second time.

Another feature of the present invention is the provision in such a gated barrier, of the visual indicator apparatus including a hand wheel and a threaded shaft, where the threaded shaft includes inner and outer ends, where the inner end of the threaded shaft is insertable into the second standard, where the outer end of the threaded shaft is adjacent to one of the opposing surfaces, where the hand wheel turns on the threaded shaft and is turnable against the second standard so as to draw the second standard from an oblique relationship with the threshold to a right angle relationship with the threshold, and where the hand wheel includes a receptacle formed therein with the receptacle opening toward the second standard.

Another feature of the present invention is the provision in such a gated barrier, of a coil spring engaged between the second standard and the hand wheel, where the coil spring includes a predetermined amount of compression, and where the coil spring is received in the receptacle.

Another feature of the present invention is the provision in such a gated barrier, of the coil spring being wholly received in the receptacle at the second time.

Another feature of the present invention is the provision in such a gated barrier, of the visual indicator apparatus including a first toggle clamp between the second standard and one of the opposing surfaces.

Another feature of the present invention is the provision in such a gated barrier, of a second toggle clamp between the second standard and one of the opposing surfaces, where the first toggle clamp is above the second toggle clamp.

Another feature of the present invention is the provision in such a gated barrier, of a hand wheel between the first toggle clamp and the opposing surface adjacent to the second standard.

Another feature of the present invention is the provision in such a gated barrier, of the visual indicator including a bubble level on the second standard, where the bubble level includes two markings, where a bubble in the bubble level is between the two markings at the second time.

Another feature of the present invention is the provision in such a gated barrier, of the visual indicator including an over center mechanism, where the over center mechanism starts operation at the first time and finishes operation at the second time, and where the over center mechanism is under center at the first time and over center at the second time.

Another feature of the present invention is the provision in a gated barrier, of a visual indicator showing that a gated barrier has been pressurized against two opposing surfaces.

Another feature of the present invention is the provision in such a gated barrier, of a frame, where the frame includes a threshold, where the frame includes a first standard extending upwardly from the threshold, and where the frame includes a second standard extending upwardly from the threshold, of a gate in the frame between the first and second standards, of the first standard being set at a predefined angle relative to the threshold, of the second standard being set at a predefined angle relative to the threshold, of a visual indicator apparatus on the frame that indicates that the frame has been pressurized relative to one or more of the opposing surfaces.

Another feature of the present invention is the provision in such a gated barrier, of the visual indicator including a threshold portion having an over center mechanism to pressurize ends of the threshold against the two opposing surfaces.

Another feature of the present invention is the provision in such a gated barrier, of the visual indicator including a second standard portion having an over center mechanism.

Another feature of the present invention is the provision in such a gated barrier, of the frame including a first telescoping member on the first standard and a second telescoping member on the second standard, where the first and second telescoping members are drawn apart and toward the opposing walls by an over center mechanism.

An advantage of the present invention is that reliance has been minimized on the hand wheel to determine how much a gate has been pressurized. A visual indicator of the present invention positively through sight lets the end user know when an oblique standard has been brought into a right angle relationship with the threshold.

An advantage of the present invention is that reliance has been minimized on the hand wheel to determine whether a gate has been pressurized. A visual indicator of the present invention positively through sight lets the end user know when the gated barrier has been pressured between two opposing surfaces.

BRIEF DESCRIPTION OF THE DRAWINGS

FIG. 4 shows a threshold having a visual indicator apparatus, where threshold portions are yet to be engaged to each other.

DESCRIPTION

Figure 1:
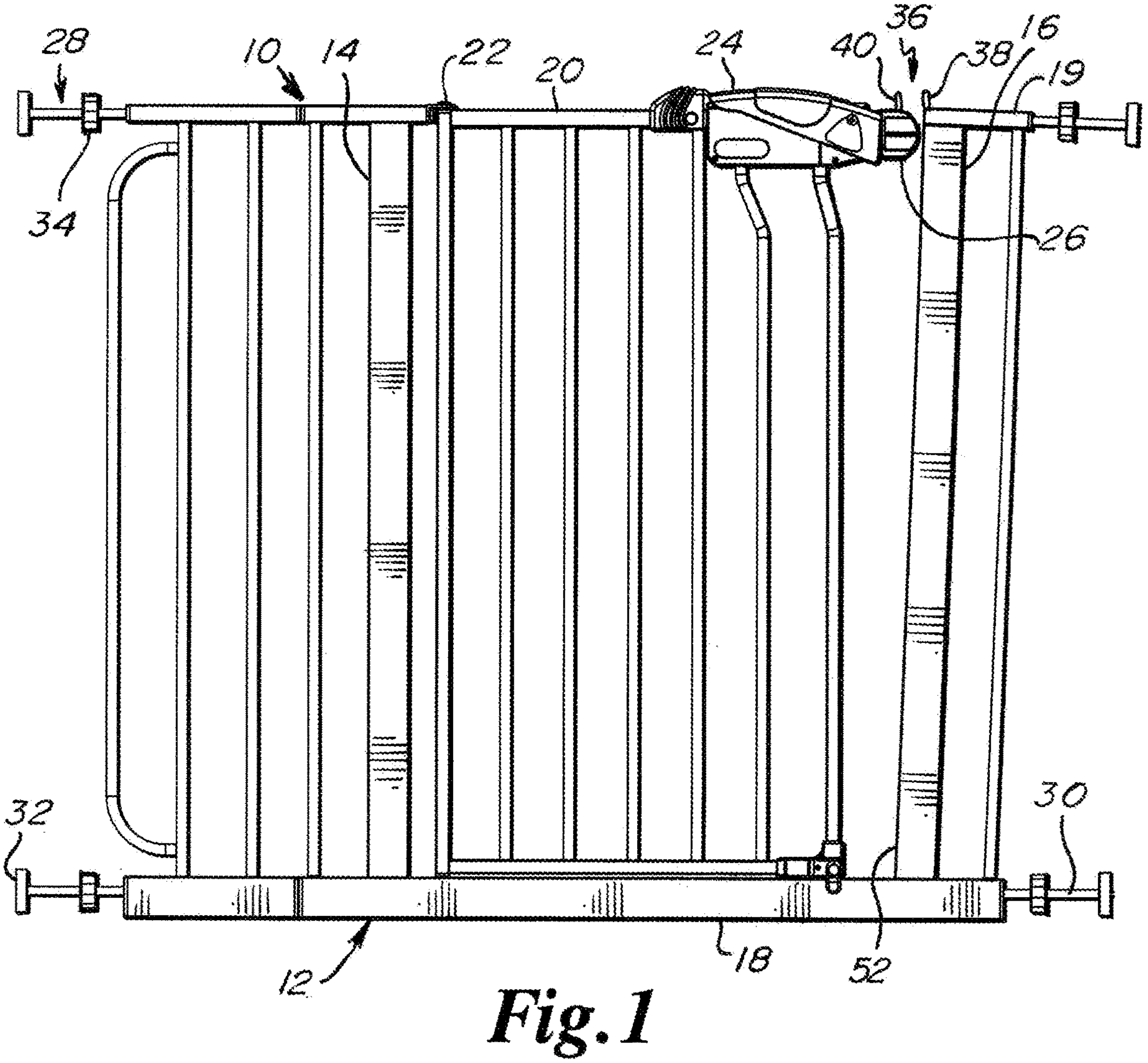
FIG. 1 is a side view of a pressure gate apparatus having an oblique standard manufactured with a predetermined amount of pressure, where the pressure gate apparatus has not yet been placed under pressure, where a visual indicator apparatus includes a pair of pins, where one of the pins is on the gate and the other of the pins is on the frame of the gate.

As shown in FIG. 1, a gated barrier or pressurized gate apparatus is indicated in general by the reference number 10. The gated barrier 10 includes a generally U-shaped frame 12. The U-shaped frame 12 includes a first vertically extending standard 14, second vertically extending standard 16, and a threshold 18. Frame 12 further includes a top tubular horizontal piece 19 extending outwardly from the top of standard 16.

The gated barrier 10 includes a gate 20 that is swingable on a swing axis 22 to both sides of the threshold 18. The gate 20 includes a latch apparatus 24 that includes a latch 26 that slides into and out of a body of the latch apparatus 24.

The gated barrier 10 includes four sets of hand wheel apparatus 28. Hand wheel apparatus 28 includes a threaded shaft 30 that slips or slides into a horizontal tubular portion of the frame 12. Even though shaft 30 is threaded, shaft 30 does not threadingly engage such horizontal tubular portion of the frame 12. An inner end portion of the shaft 30 is disposed within such horizontal tubular portion and is confined from inordinate wobble or up and down motion or side to side motion by a circular opening at the outer end of such horizontal tubular portion. Such circular opening is slightly greater than the diameter of the threaded shaft 30. Hand wheel apparatus 28 includes a disk outer end 32 that is rigidly or pivotally set at the outer end of the threaded shaft 30. Disk outer end 32 may be set in a wall cup that is anchored to a door jamb or wall of a house. Hand wheel apparatus 28 includes a hand wheel 34 that threadingly engages the threaded shaft 30. Hand wheel 34 is receptacle shaped and includes an inner wall. When hand wheel 34 is turned and travels inwardly toward the frame 12, such inner wall will begin to engaged the outer end of the horizontal tubular portion of the frame 12, whereupon the threaded shaft 30 and disk outer end 32 will be driven, relatively, outwardly of the frame 12, whereupon the disk outer end 32 will begin to place pressure upon each of the wall of the house and the U-shaped frame 12, whereupon the oblique vertical standard 16 is driven towards and into a right angle relationship with threshold 18, whereupon an upper portion of standard 16 engages latch 26, and whereupon the gated barrier 10 is operational.

Figure 2:
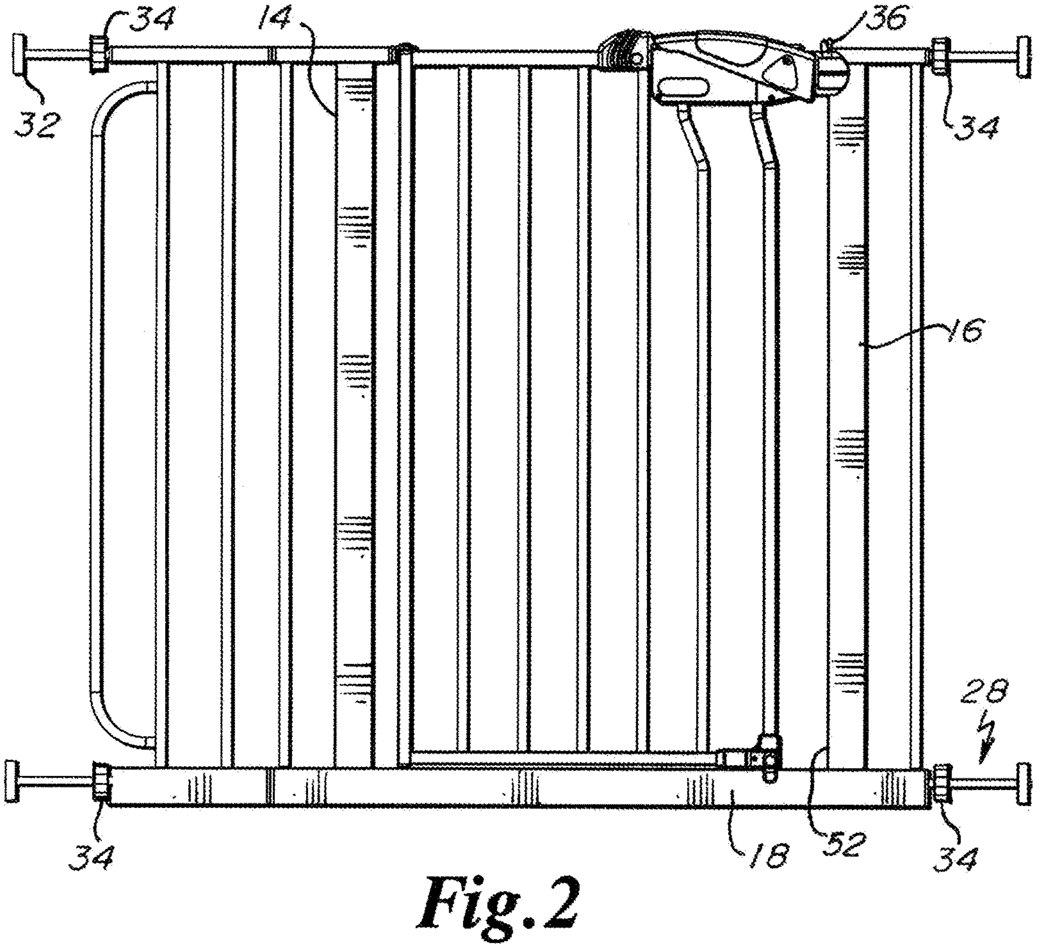
FIG. 2 is a side view of the pressure gate apparatus of FIG. 1 having been placed under pressure and where the pins have been laterally aligned.
Figure 2A:
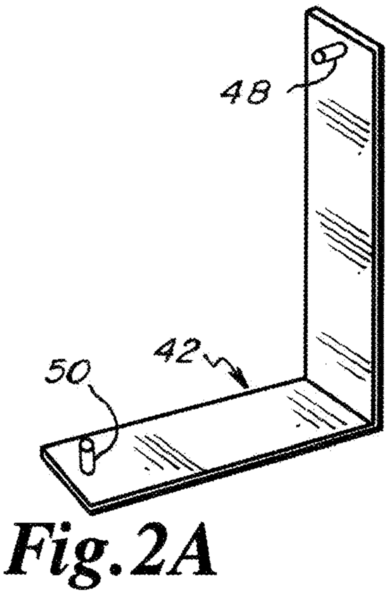
FIG. 2A is a front perspective view of the visual indicator apparatus of FIG. 1A.
Figure 2B:
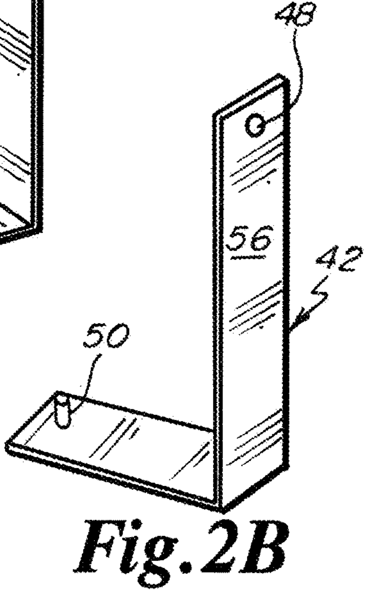
FIG. 2B is a rear perspective view of the visual indicator apparatus of FIG. 2A.
Figure 2C:
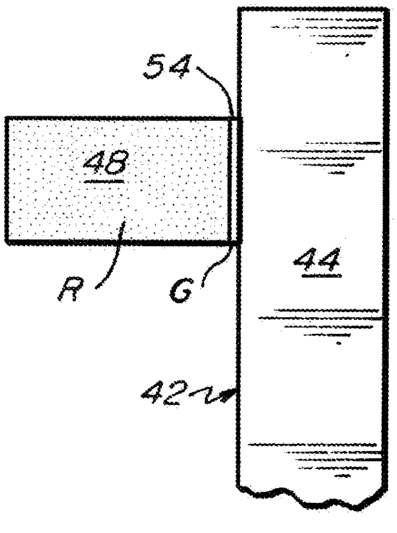
FIG. 2C is a detail view of an indicator plug of the visual indicator apparatus of FIG. 2A.

Gated barrier 10 includes a visual indicator apparatus 36 that includes a vertically extending tab or pin 38 vertically extending from the oblique standard 16 and a vertically extending tab or pin 40 vertically extending from the latch 26. When pins 38, 40 are laterally aligned, as shown in FIG. 2, vertical standard 16 is at the desired right angle relationship with the threshold 18. When the vertical standard 16 and the threshold 18 have a right angle relationship, then there is the desired predefined pressure between 1) the gated barrier 10 and 2) the opposing vertical surfaces between which the gated barrier 10 is engaged. Instead of such tabs or pins 36, 38, or in combination with such tabs or pins 36, 38, a first lateral line or indicia can be imprinted or engraved upon the latch 26, and a second lateral line or indicia can be imprinted or engraved upon the standard 16 and/or the horizontal tubular piece 19 to show that, when such first and second lateral lines are laterally aligned, the standard 16 and threshold 18 are at a right angle relationship, or respective axis of the standard 16 and threshold 18 are at a right angle to each other.

Figure 1A:
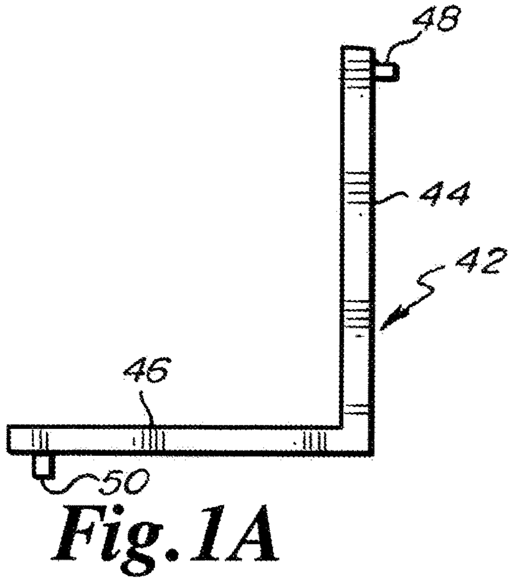
FIG. 1A is a side view of a visual indicator apparatus in the form of a carpenter's square having a color coded push button.
Figure 1B:
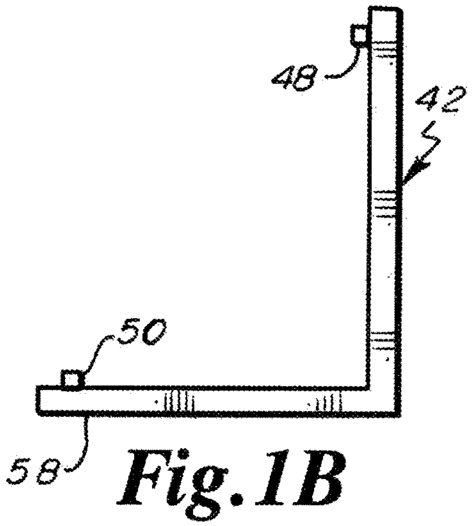
FIG. 1B is a side view of the visual indicator apparatus of FIG. 1A.

FIGS. 1A, 1B, 2A, 2B, and 2C show a visual indicator apparatus 42 in the form of a carpenter's square. Carpenter's square 42 includes a first arm 44 having a distal end set at a right angle to a second arm 46 having a distal end. The distal end of the first arm 44 has an opening engaging a first plug 48. The distal end of the second arm 46 has an opening engaging a second plug 50. FIG. 1A shows the carpenter's square 42 in a position ready for use, such as to be pressed into a corner location 52 shown in FIG. 1, where second arm 46 is placed on top of the threshold 18 and where the first arm 44 is pressed against the standard 16. This operation is performed when the gate 20 is in an open position. If the standard 16 and threshold 18 are square, then a fine band 54, shown in FIG. 2C, slides out into the open and visible to the end user trying to square the standard 16 and threshold 18. This fine band 54 appears when the rear end of plug 48 is flush with a rear surface 56 of first arm 44, or when the rear end of plug 50 is flush with a rear surface 58 of second arm 46. Each of the plugs 48, 50, have such a fine annular band 54, preferably color coded in the color green as in "green to go." The thickness of such fine band 54 is preferably about a millimeter thick. Each of the plugs 48, 50 preferably have an internal mechanism that relates to the carpenter's square 42 such that the plugs 48, 50 are slideable back and forth but are not slideable out of the carpenter's square. Although a carpenter's square 42 having only one plug 48 or 50 may be used, the provision of having both plugs 48 and 50 is preferred. Each of the plugs 48 and 50 has a singular green annular band 54. The remaining surface area of each of the plugs 48, 50 may remain uncolored or color coded in a color such as red. When the carpenter's square 42 is pressed into location 52 and both of the green annular bands 54 appear, the standard 16 and threshold 18 are square. A preferred method of operating the carpenter's square 42 is first placing the second arm 46 on the threshold 18 and pressing down until the green annular band 54 on plug 50 appears, and second sliding the carpenter's square 42 toward the standard 16. If the green annular band 54 does not appear on plug 48 when the first arm 44 hits the standard 16, then the carpenter's square 42 is removed, and then one or more hand wheels 34 is further cranked. Then the above first and second steps are repeated until the green annular band 54 appears on the first plug 48.

Figure 3:
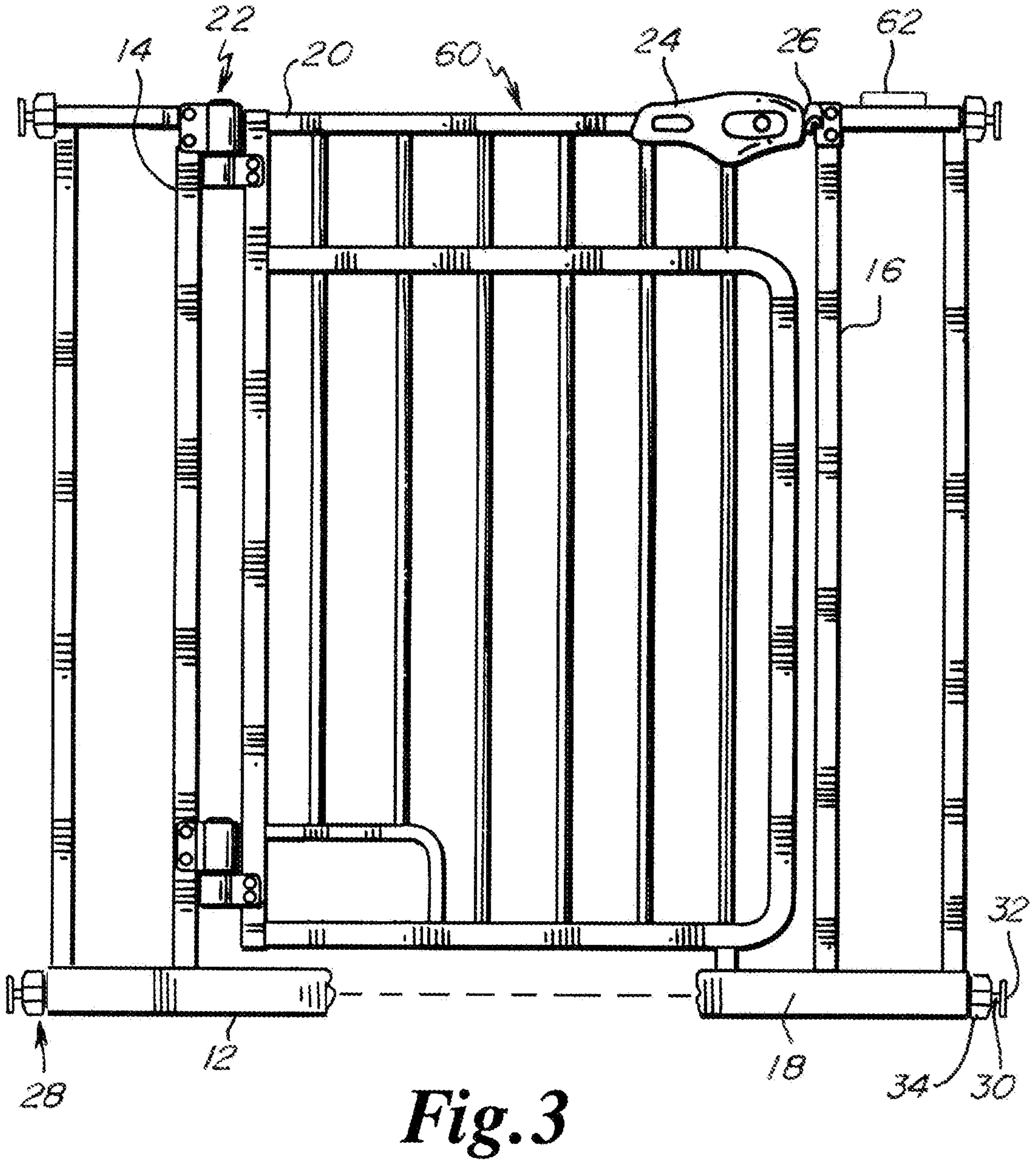
FIG. 3 is a side view of a pressure gate apparatus having, as a visual indicator apparatus, a bubble level, and further shows that a pressure gate apparatus may have a number of different types of thresholds.

FIG. 3 shows a gated barrier 60 or pressurized gate apparatus 60 that includes a frame 12, a standard 14, an oblique standard 16, a threshold 18, a gate 20, a swing axis 22, a latch apparatus 24, a latch 26, and four sets of hand wheel apparatus 28 having a threaded shaft 30, a disk end 32, and a hand wheel 34. A portion of the threshold is shown in phantom to indicate that various types of thresholds may be utilized. Gated barrier 60 may include a visual indicator apparatus 62 in the form of a bubble level.

Figure 4:
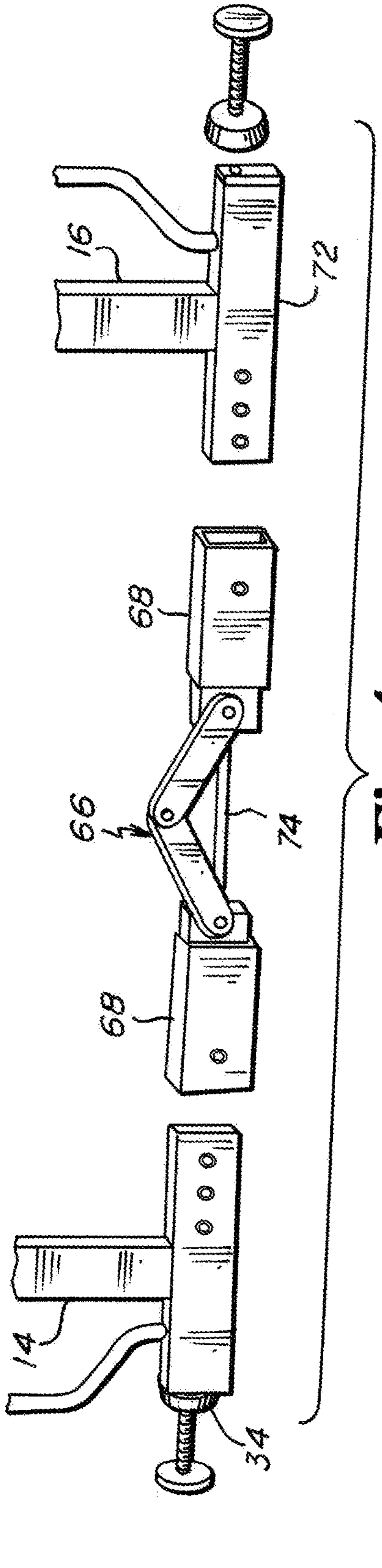
FIG. 4 is a side view of one type of threshold for a gated barrier, such as the pressure gate apparatus of FIG. 3, where
Figure 4A:
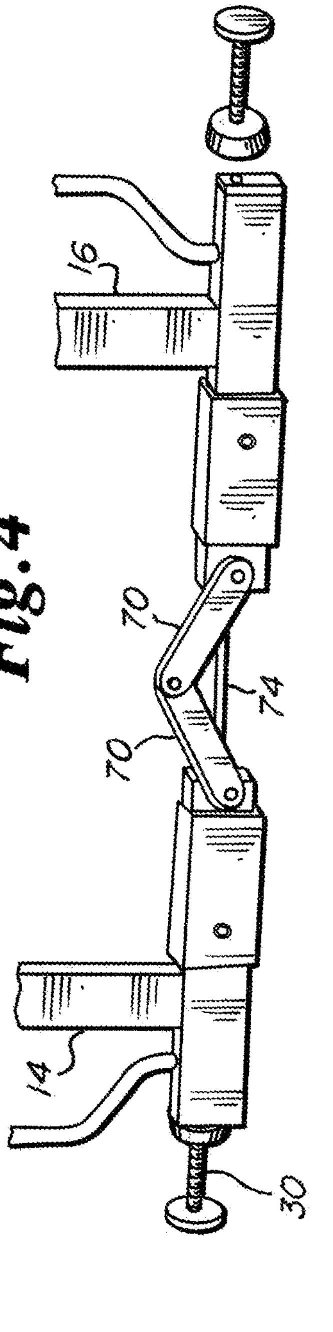
FIG. 4A shows the threshold portions of FIG. 4 engaged but the visual indicator apparatus not yet having been operated.
Figure 4B:
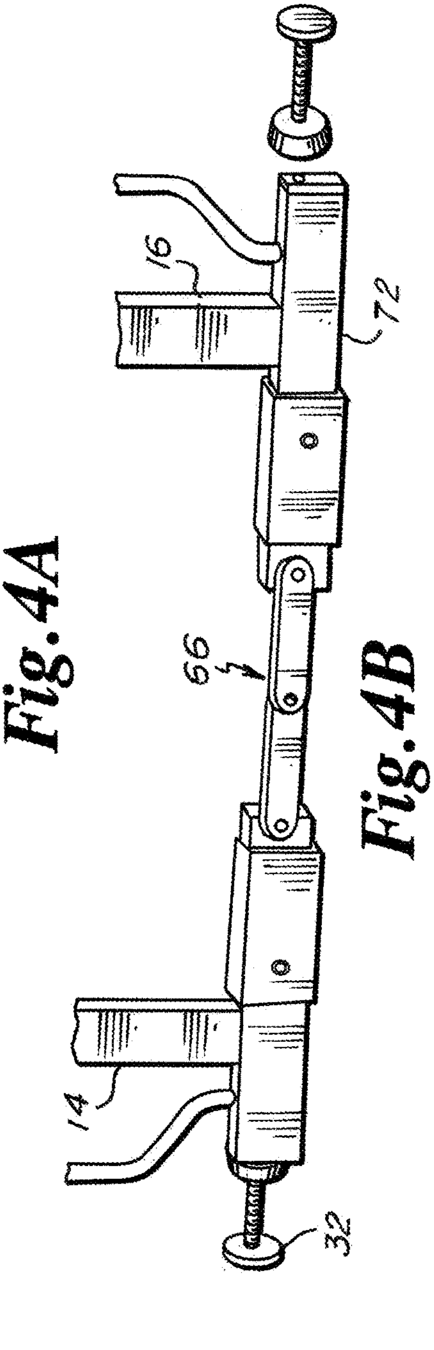
FIG. 4B shows the threshold portions of FIG. 4A engaged and the visual indicator apparatus having been operated to fix the gate apparatus with a predetermined amount of pressure.

One of the thresholds that may be employed in gated barrier 10 includes threshold apparatus 64 shown in FIGS. 4, 4A, and 4B. Threshold apparatus 64 includes a visual indicator apparatus 66 in the form of an over center mechanism 66. Over center mechanism 66 is pivotally engaged to a pair of inner threshold portions 68. Over center mechanism 66 includes two arms 70, where the two arms 70 are pivotally engaged at inner ends and where each of the two arms 70 is pivotally engaged at an outer end to one of the threshold portions 68. Threshold portions 68 are female members and have receptacles at their outer ends for receiving male threshold portions 72. Female threshold portions 68 may be adjustably set in the longitudinal direction relative to male threshold portions 72 by a pin engaging lateral pin holes in the portions 68, 70. Threshold 64 is first engaged to its respective gate without stepping down on the over center mechanism 66. Then all four sets of hand wheel apparatus 28 are operated to set the standard 16 at a first angle, such as a right angle, to the threshold 18 without stepping down on the over center mechanism 66. This operation occurs successfully because of the elongate rigid piece or rod 74 that is set between the female threshold portions 68 limits the distance that the female threshold portions 68 can be drawn together, but does not limit the distance that the female threshold portions 68 can be drawn apart. In other words, the ends of the rod 74 are set in openings where the distance between the closed ends of the openings are greater than the length of the rod 74. Once the over center mechanism 66 has been stepped upon to lengthen the effective length of the threshold 64, the standard 16 and its respective threshold portion 72 have a second angle, such as an acute angle or right angle.

Figure 5:
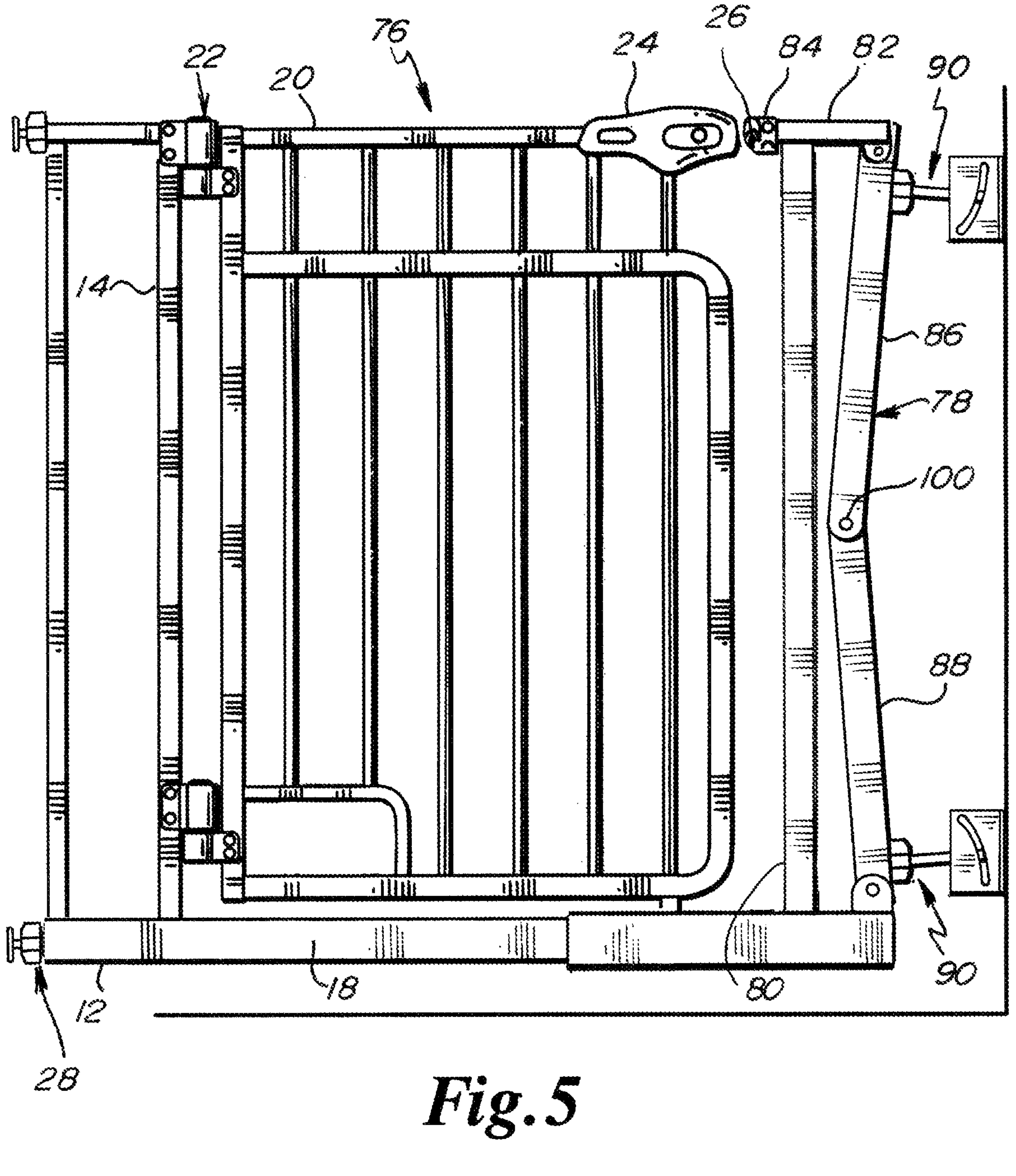
FIG. 5 shows a pressure gate apparatus having a pivoting over center standard as a visual indicator apparatus, and shows the pivoting over center standard prior to being operated.
Figure 6:
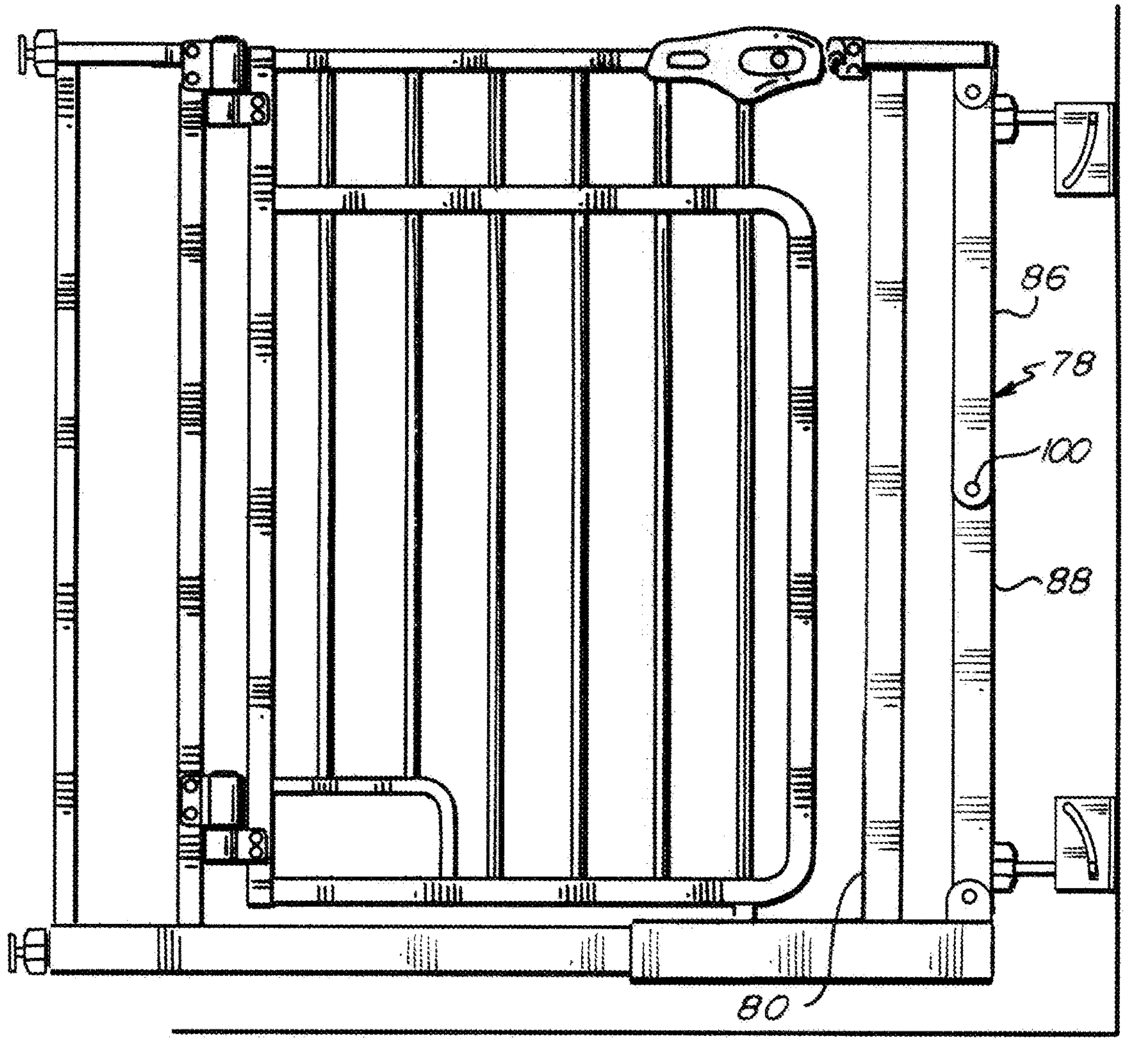
FIG. 6 shows the pressure gate apparatus of FIG. 5 where the pivoting over center standard has been operated.
Figure 6A:
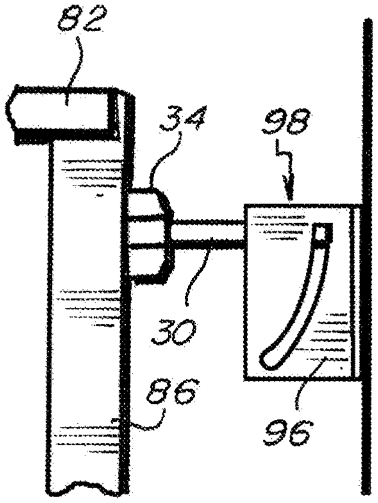
FIG. 6A is a detail view of a hand wheel shaft end wall connector for the upper hand wheel shaft end.
Figure 6B:
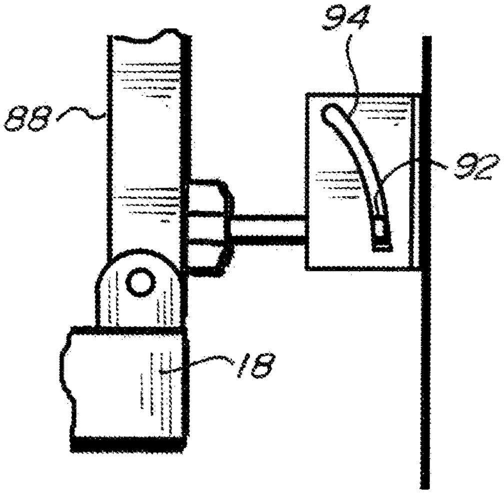
FIG. 6B is a detail view of a hand wheel shaft end wall connector for the lower hand wheel shaft end.

FIG. 5 shows a gated barrier or pressurized gate apparatus 76 that includes a frame 12, a standard 14, an over center standard 78 or visual indicator apparatus 78, a threshold 18, a gate 20, a swing axis 22, a latch apparatus 24, a latch 26, and two sets of hand wheel apparatus 28 having a threaded shaft 30, a disk end 32, and a hand wheel 34.

Gated barrier 76 further includes a standard 80 in the nature of standard 14, where standard 14 is a standard set at a right angle at all times to threshold 18. Standard 80 runs between the threshold 18 and an upper horizontal tubular piece 82 that engages a latch receiver 84.

Over center mechanism or over center standard 78 includes upper and lower arms 86, 88, respectively, that are pivotally engaged to each other. Upper arm 86 is further pivotally engaged to horizontal tube 82 and lower arm 88 is further pivotally engaged to an outer end of the threshold 18.

Gated barrier 76 further includes a pair of modified upper and lower hand wheel apparatus 90. Hand wheel apparatus 90 includes a threaded shaft 30 and a hand wheel 34. Instead of the end disk 32, hand wheel apparatus 90 includes a cross-piece 92 such that threaded shaft 30 is T-shaped. Each of the ends of the cross-piece 92 rides in a curved slot 94 of an ear 96 of a wall connector 98. Wall connector 98 is U-shaped and includes a pair of the ears 96 extending from a base, where such base is engaged such as with screws to a wall.

In operation, the hand wheel apparatus 28 and 90 are operated by turning the hand wheels 34 inwardly. As the hand wheels 34 are turned inwardly, the center pivot 100, having a handle or knob, may travel inwardly such that the lower end of arm 86 and the upper end of arm 88 may hit the outer side of the standard and stop the over center mechanism 90 from such an inward pivoting. Then the hand wheels 28 and 90 are tightened as much as possible by hand. Then the knob of the pivot 100 is grasped and the over center mechanism 90 is pulled outwardly to an over center position. As this pulling step is occurring, the ends of the cross-piece 92 slide in the curved slot 94. The upper cross-piece 92 slides toward an upper end of its respective slot 94. The lower cross-piece 92 slides toward a lower end of its respective slot 94. When the upper and lower cross-pieces 92 are in their respective ends of their respective slots 94, the gated barrier 10 is under proper tension.

In gated barrier 76, it should be noted that the threaded shafts 30 of hand wheel mechanisms 90 extend through openings in their respective upper and lower arms 86 and 88 in the slip or slid manner that threaded shafts 30 extend into openings employed with hand wheel apparatus 28.

Figure 7:
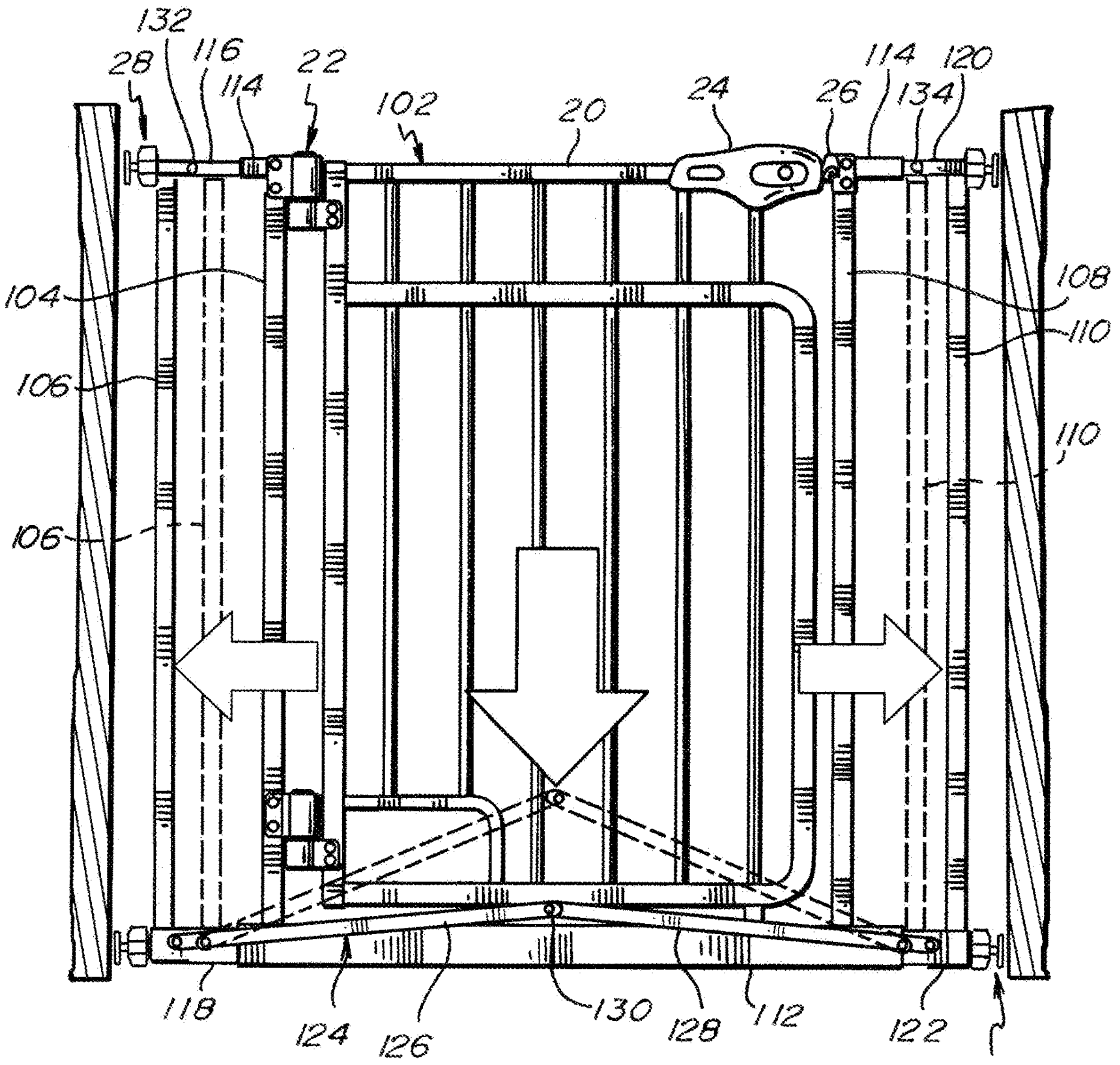
FIG. 7 is a side view of a pressure gate apparatus having a permanent visual indicator apparatus that extends a telescoping threshold and thus also extends the vertical standards of the pressure gate apparatus.

FIG. 7 shows a gated barrier 102 or pressurized gate apparatus 102 that includes a pair of left end outer and inner standards 104, 106, a pair of right end outer and inner standards 108, 110. The lower ends of the inner standards 104, 108 are engaged by a female threshold portion 112. Inner standards 104, 108 and female threshold portion 112 are in the nature of the frame 12. This frame 12 is engaged to a gate 20, a swing axis 22, a latch apparatus 24, and a latch 26. Frame 12 further includes upper horizontal female tube portions 114. Left outer standard 106 includes an upper male arm 116 that extends into female tube portion 114 and a lower male threshold portion 118 that extends into the left open end of female threshold portion 112. Right outer standard 110 includes an upper male arm 120 that extends into its respective female tube portion 114 and a lower male threshold portion 122 that extends into the right open end of female threshold portion 112. Upper male arm 116 and its respective tube 114 telescope relative to each other and include an internal ratchet mechanism that permits extension but not retraction without a key. Upper male arm 120 and its respective tube 114 telescope relative to each other and include an internal ratchet mechanism that permits extension but not retraction without a key. Lower male threshold portion 118 and female threshold portion 112 telescope relative to each other and include an internal ratchet mechanism that permits extension but not retraction without a key. Lower male threshold portion 122 and female threshold portion 112 telescope relative to each other and include an internal ratchet mechanism that permits extension but not retraction without a key. A key holder can unlock the internal ratchet mechanism so as to release the gated barrier 102 from the two opposing vertical surfaces.

Gated barrier 102 further includes an over center mechanism or visual indicator apparatus 124. The over center mechanism includes a pair of arms 126, 128 that are pivotally engaged to each other by a central pivot 130 having a knob. Further, arm 126 is pivotally engaged to male threshold portion 118 and arm 128 is pivotally engaged to male threshold portion 122. In operation, the hand wheels 34 are turned inwardly to place the gated barrier 102 under pressure by hand. Then, to place the gated barrier 102 under further pressure, the center pivot 130 of the over center mechanism 124 is drawn down by its knob to push the male threshold portions 118, 122 apart. At the same time, male arms 116, 120 are drawn apart.

Figure 8:
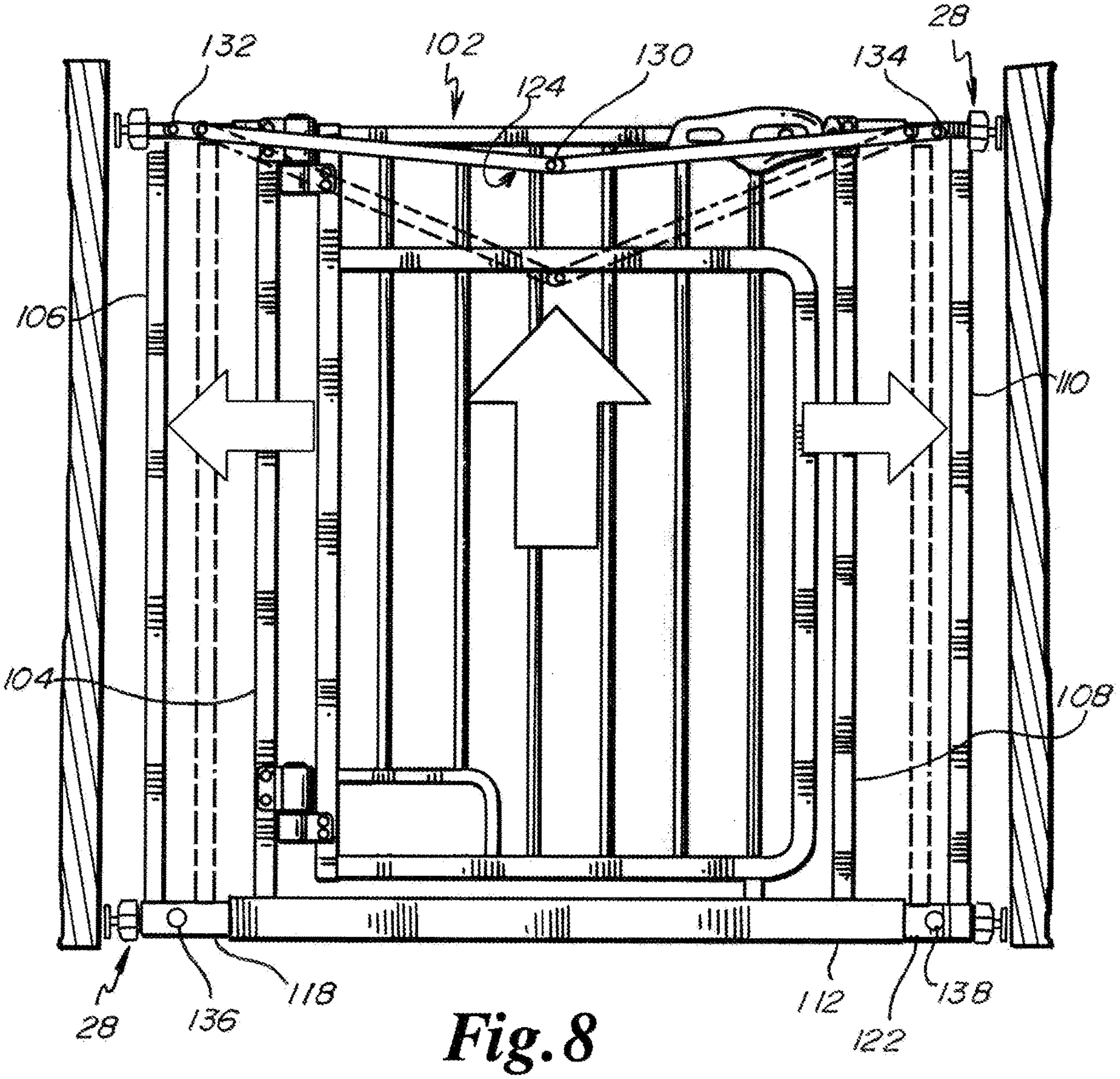
FIG. 8 is a side view of a pressure gate apparatus having a temporary visual indicator apparatus that extends telescoping upper frame portions of the pressure gate apparatus.
Figure 9:
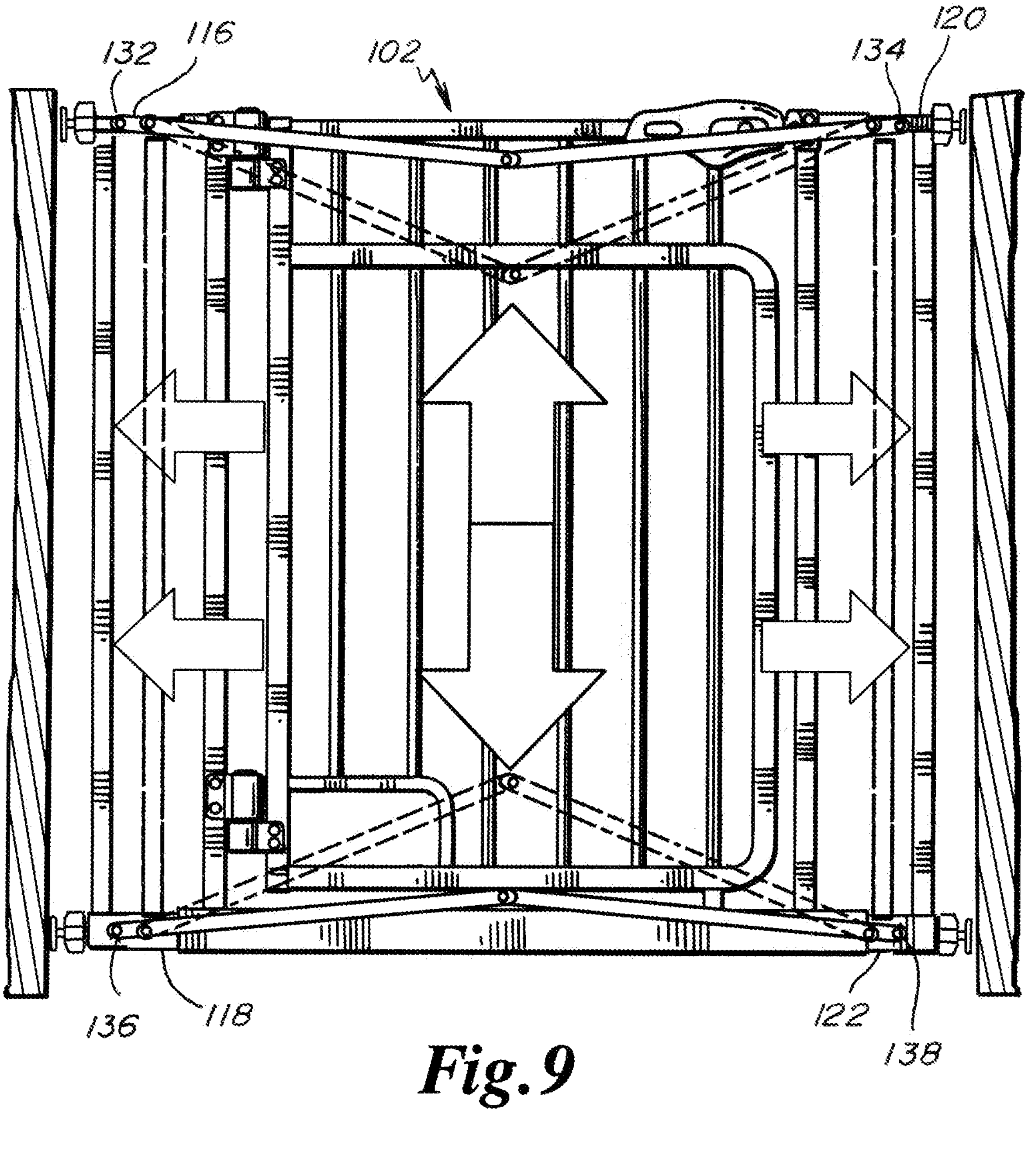
FIG. 9 is a side view of a pressure gate apparatus having both a permanent visual indicator apparatus for the telescoping standard and a temporary visual indicator apparatus for telescoping upper frame portions of the pressure gate apparatus.

Over center mechanism 124 may be a tool 124 that is not permanently fixed to the gate 102. For example, FIG. 7 shows a pin connector 132 on male arm 116 and pin connector 134 on male arm 120, where each of the pin connectors 132, 134 removably engages an end of each of the arms 126, 128 of the over center mechanism 124. Also, FIG. 8 shows a pin connector 136 on male threshold portion 118 and pin connector 138 on male threshold portion 122, where each of the pin connectors 136, 138 removably engages an end of each of the arms 126, 128 of the over center mechanism 124. FIG. 9 shows that two tools 124 or over center mechanisms 124 or visual indicator apparatus 124 may be used at the same time to pressurize the gated barrier 102.

Preferably with gated barrier 102, all four sets of hand wheel apparatus 28 are first operated to pressurize the gated barrier 102. Then two tools 124 are operated at the same time to place further pressure between the gated barrier 102 and its two opposing vertical surfaces.

Figure 10:
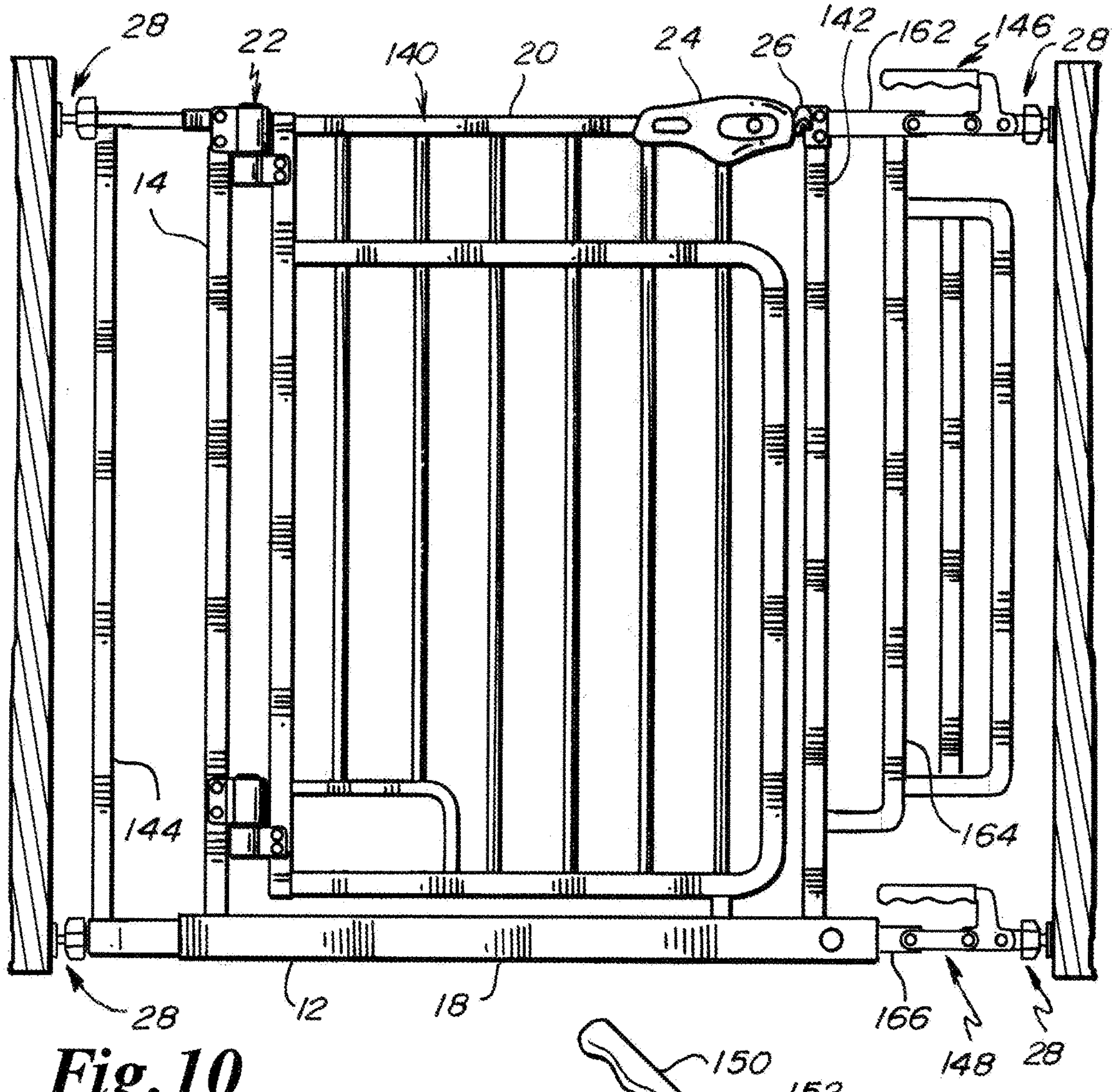
FIG. 10 is a side view of a pressure gate apparatus having, as a visual indicator apparatus, a clamp.
Figure 10A:
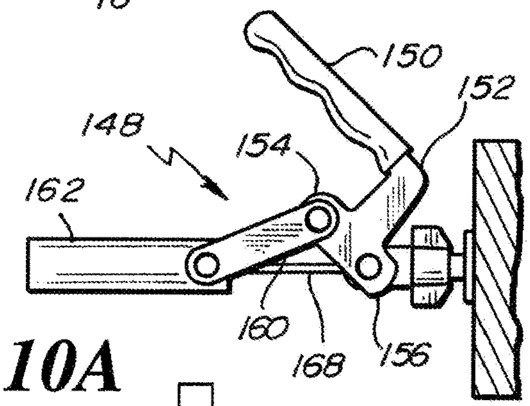
FIG. 10A is a detail view of the visual indicator apparatus of FIG. 10 prior to placing tension in the pressure gate apparatus.
Figure 10B:
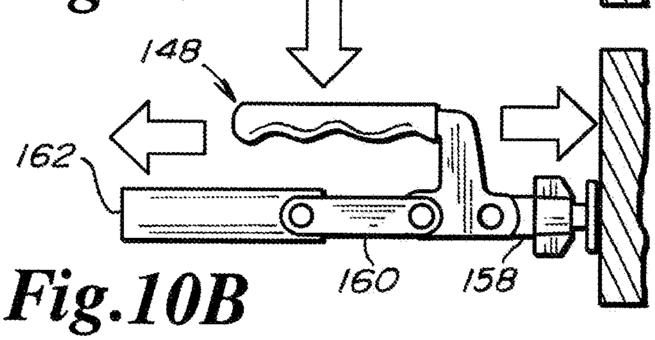
FIG. 10B is a detail view of the visual indicator apparatus of FIG. 10A having been operated to place a predetermined amount of tension or pressure into the pressure gate apparatus.

FIG. 10 shows a gated barrier 140 or pressurized gate apparatus 140 that includes a left standard 14, a right standard 142, and a threshold 18 that form a frame 12. Gate barrier 140 further includes, mounted by and within the frame 12, a gate 20, a swing axis 22, a latch apparatus 24, a latch 26, and four sets of hand wheel apparatus 28 having a threaded shaft 30, a disk end 32, and a hand wheel 34. Hand wheel apparatus 28 are mounted on a U-shaped frame extension 144 having a standard and two horizontally extending tube portions engaging upper and lower portions of frame 12 adjacent to standard 14. If desired, right standard 142 may be an oblique standard, such as standard 16, at the time of manufacture, which standard is then brought into a right angle relationship by the end user when setting up gated barrier 140. With such an oblique standard, one or more of toggle clamps 146, 148 may be employed.

Gated barrier 140 includes a pair of toggle clamp apparatus 146, 148 or a pair of visual indicator apparatus 146, 148. Each of the toggle clamps 146, 148 includes a handle 150 rigidly fixed to a T-shaped piece 152 having a pair of ends 154, 156. End 156 is pivotally fixed to a tubular piece 158 that receives a shaft 30 of a hand wheel apparatus 28. End 154 is pivotally fixed to a bar 160 that is in turn pivotally fixed to frame 12 of gated barrier 140. In the case of the upper toggle clamp apparatus 146, bar 160 is pivotally affixed to a horizontal tube 162 that is rigidly fixed to an upper portion of standard 142. Horizontal tube 162 is further rigidly mounted on an L-shaped vertical frame support 164 that has a lower end that is rigidly affixed to a lower portion of standard 142. In the case of the lower toggle clamp apparatus 148, bar 160 is rigidly mounted on a threshold extension 166 that is rigidly mounted to an end of threshold 18. In operation, with the toggle clamp apparatus 146, 148 in a nontensioned state, the hand wheels 34 are turned inwardly so as to pressurize gate 140. Toggle clamp apparatus 146, 148, in their nontensioned state, provide longitudinal support. However, if desired, toggle clamp apparatus 146, 148 can include a rod 168 or other elongate rigid piece between tube 162 and tube 158 that permits tubes 162, 158 to be extended relative to each other but not to be drawn together, where such relationship has already been called out above with respect to rod 74 and visual indicator 66. In the case of toggle clamp apparatus 148, rod 168 would be disposed between threshold portion 166 and tube 158. Then, when hand wheels 34 have pressured gated barrier 140 to the desired degree, toggle handles 150 of the toggle clamp apparatus 146, 148 are pushed down, at the same time or at different times, to further pressurize gated barrier 140. It should be noted that, if desired, hand wheel apparatus 28 may not be disposed on tube 158. Tubes 158 can engage a wall friendly end such as an end disk 32.

It should be noted that the pivot at the inner end of bar or arm 160 may be slidingly mounted on tube 162 or portion 166. Such a slide mount may include a coil spring such that the inner end of bar or arm 160 may be adjusted longitudinally to adjust the amount of leverage it may take to operate clamp 146 or clamp 148.

Figure 11:
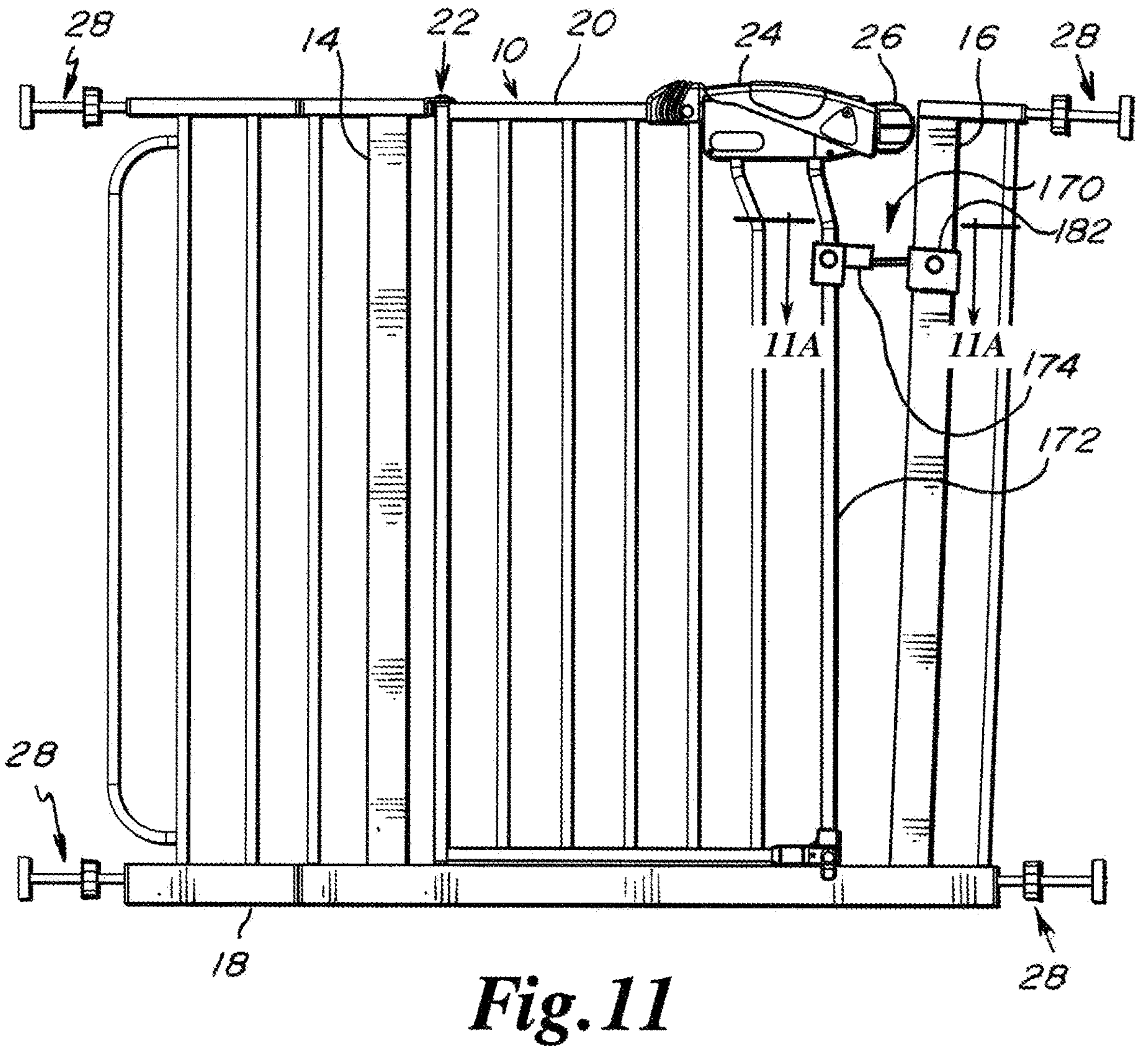
FIG. 11 is a side view of a pressure gate apparatus having a visual indicator apparatus in the form of a colored coded tongue sliding into a box having a window such that the end user can see when the color green appears in the box, an indication that the oblique standard is at a right angle.
Figure 11A:
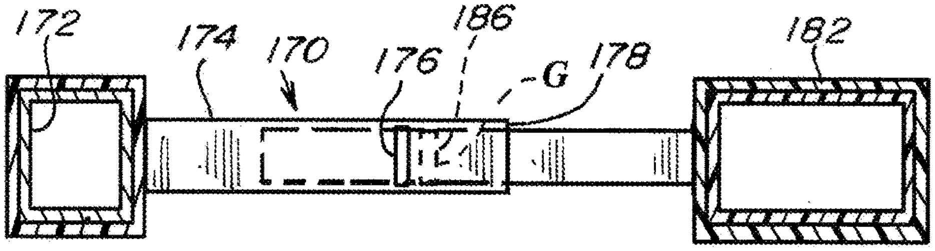
FIG. 11A is a top view of the visual indicator apparatus of FIG. 11.
Figure 11B:
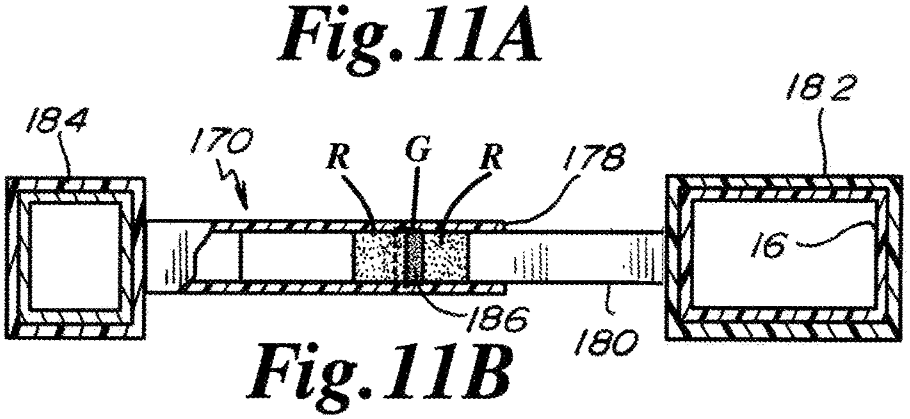
FIG. 11B is a partially cut away top view of the visual indicator apparatus of FIG. 11.

FIG. 11 shows gated barrier 10 and a visual indicator apparatus 170 between the oblique standard 16 and an upright frame support member 172 of the gate 20. Visual indicator apparatus 170 includes a box 174 having an upper window 176. The box 174 includes an open end 178 that receives a tongue 180 that extends into the box 174. Tongue 180 is flexible. Tongue 180 extends from a breakaway plastic piece 182 that extends about standard 16. Breakaway plastic piece 182 is fixed at a predefined height on standard 16 and does not slide up and down. Box 174 is affixed to a breakaway plastic piece 184 that extends about gate support member 172. Breakaway plastic piece 184 is fixed at a predefined height on gate support member 172 and does not slide up and down. Tongue 180 includes a green line 186, about one millimeter in longitudinal length. Other surface portions of tongue 180 may be colored red. When standard 16 has been pushed to a right angle relationship with threshold 18, then green line 186 appears in the window 176.

Figure 12:
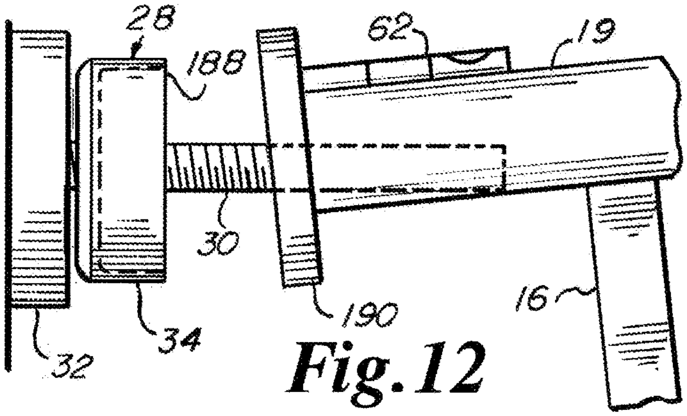
FIG. 12 is a side view of a hand wheel apparatus of a pressure gate apparatus, where the hand wheel apparatus includes a visual indicator apparatus in the form of a bubble level, and where the hand wheel has not yet engaged the oblique standard of the pressure gate apparatus.
Figure 12A:
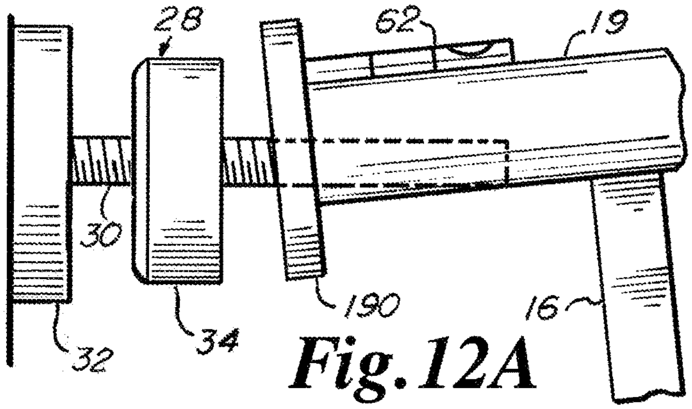
FIG. 12A is a side view of the hand wheel apparatus of FIG. 12 where the hand wheel still has not engaged the oblique standard of the pressure gate apparatus.
Figure 12B:
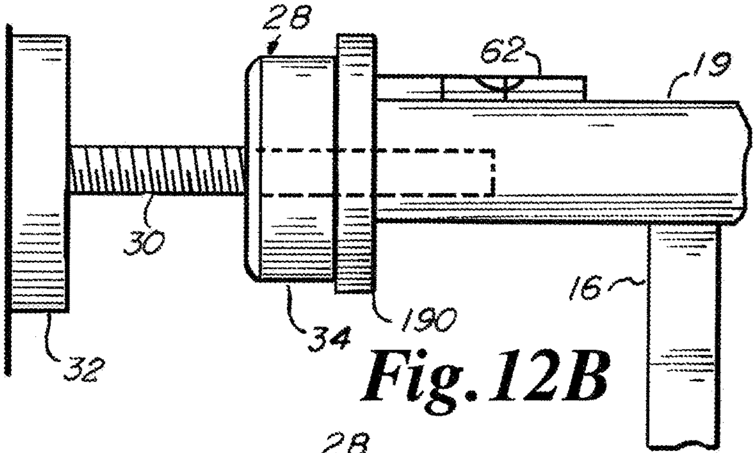
FIG. 12B is a side view of the hand wheel apparatus of FIG. 12 where the hand wheel has engaged the oblique standard and has pressurized the pressurized gate apparatus to some degree, but has not pressurized the gate apparatus to set the oblique standard to a right angle relative to the threshold.
Figure 12C:
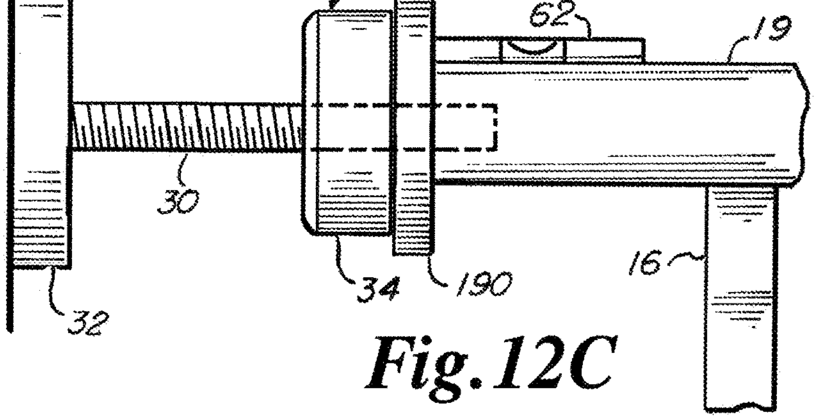
FIG. 12C is a side view of the hand wheel apparatus of FIG. 12 where the hand wheel has further engaged the oblique standard and has pressurized the pressure gate apparatus to a right angle relative to the threshold, thereby attaining the desired predefined pressure.
Figure 13:
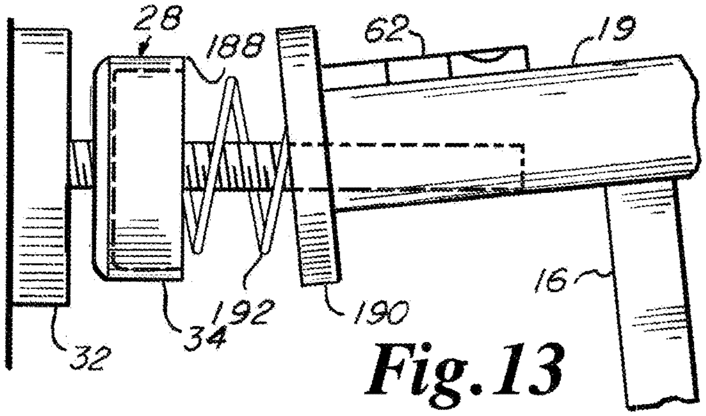
FIG. 13 is a side view of a hand wheel apparatus of a pressure gate apparatus, where the hand wheel apparatus includes a visual indicator apparatus in the form of a coil spring, and where the hand wheel has not yet engaged the oblique standard of the pressure gate apparatus.
Figure 13A:
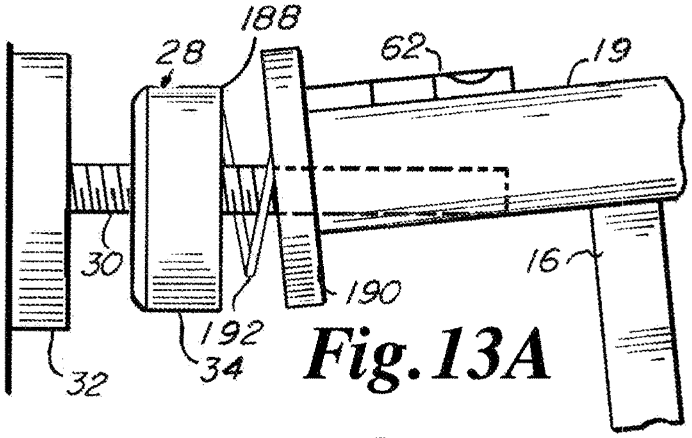
FIG. 13A is a side view of the hand wheel apparatus of FIG. 13 where the hand wheel still has not engaged the oblique standard of the pressure gate apparatus.
Figure 13B:
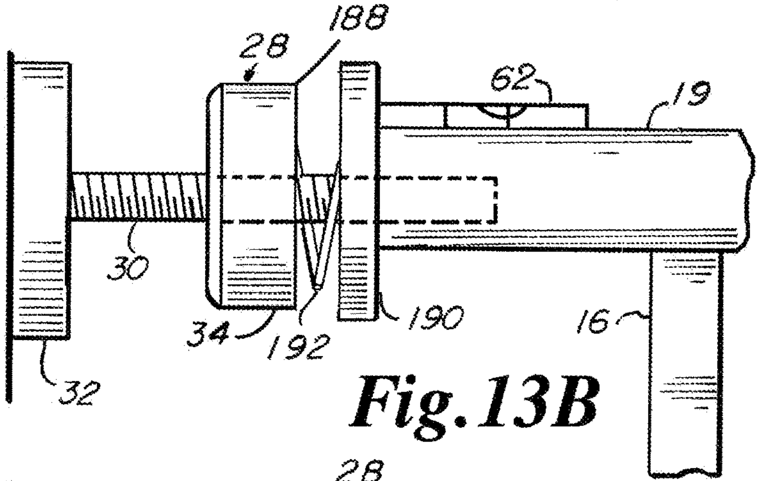
FIG. 13B is a side view of the hand wheel apparatus of FIG. 13 where the hand wheel has engaged the oblique standard and has pressurized the pressurized gate apparatus to some degree, but has not pressurized the gate apparatus to set the oblique standard to a right angle relative to the threshold; such is known to the end user because the coil spring is still visible.
Figure 13C:
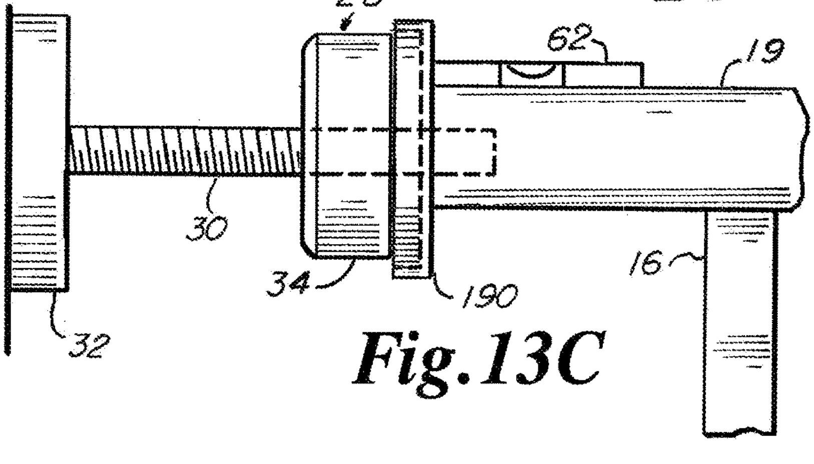
FIG. 13C is a side view of the hand wheel apparatus of FIG. 13 where the hand wheel has further engaged the oblique standard and has pressurized the pressure gate apparatus to a right angle relative to the threshold, thereby attaining the desired predefined pressure; such is known to the end user because the coil spring is no longer visible.

FIGS. 12, 12A, 12B, 12C, 13, 13A, 13B, and 13C show a modified form of a hand wheel apparatus 28. Here hand wheel 34 is receptacle shaped and includes an inner annular face 188 that engages a face of a disk 190. Disk 190 may include a plug that is received in the open end of tubular horizontal piece 19. Disk 190 includes a circular opening slightly greater in diameter than threaded shaft 30. Threaded shaft 30 slips through or slides through such opening in the disk 190 and does not threadingly engage such opening. Shaft 30 then extends into tubular piece 19. As shown by the bubble level visual indicator 62 in FIG. 12B, horizontal piece 19 is not perfectly level or perfectly at a parallel relationship with threshold 18 even through the hand wheel 34 has engaged disk 190. FIG. 12C shows that the hand wheel 34 can be turned even further so as to place horizontal piece 19 in a parallel relationship with threshold 18. With or without the bubble level 62, the same concept is applied with one end of a coil spring 192 fixed to an inner portion of hand wheel 34 and with the other end of the coil spring 192 fixed to or in disk 190. Thus, in FIG. 13B, the horizontal piece 19 may appear to be parallel with the threshold 18, but is not in fact parallel with threshold 18. However, as shown in FIG. 13C, a parallel relationship between tubular piece 19 and threshold 18 is attained by turning the hand wheel 34 until the coil spring 192 completely disappears within the receptacle shaped hand wheel 34.

As shown by the phantom line in FIG. 13C, disk 190 can be receptacle shaped so as to receive a portion of coil spring 192. If desired, hand wheel 34 may be a solid piece and the receptacle in disk 190 may be relatively deep such that the disk 190 instead of the hand wheel 34 receives the coil spring 190 upon compression of the coil spring 190.

Figure 14:
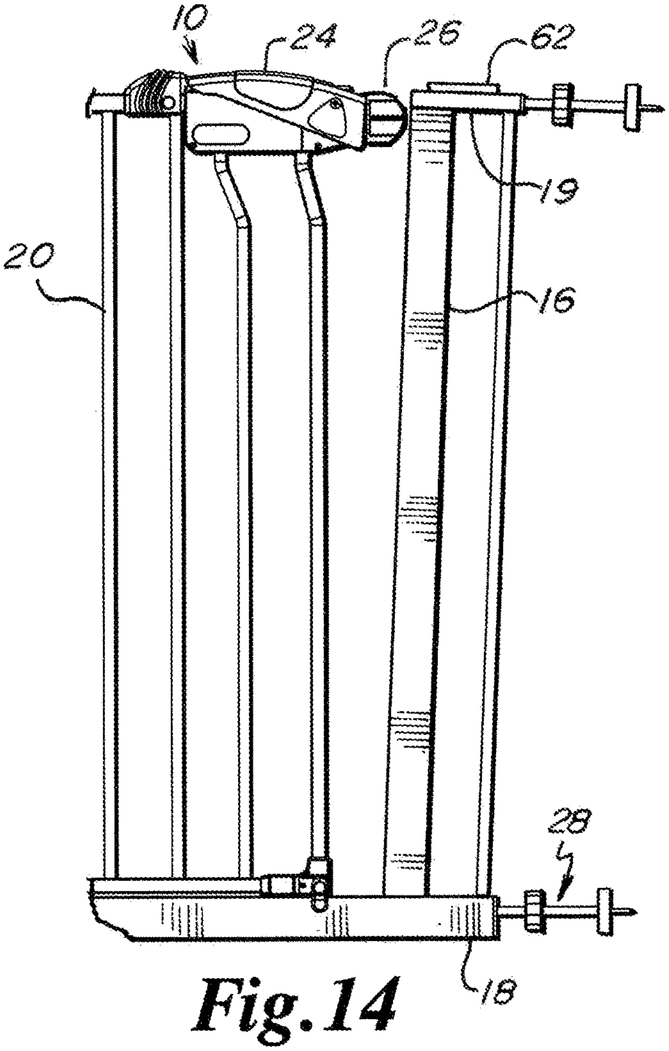
FIG. 14 is a side partial view of a pressure gate apparatus having a visual indicator apparatus in the form of a bubble level on the top of an oblique end frame portion having the oblique standard.
Figure 14A:
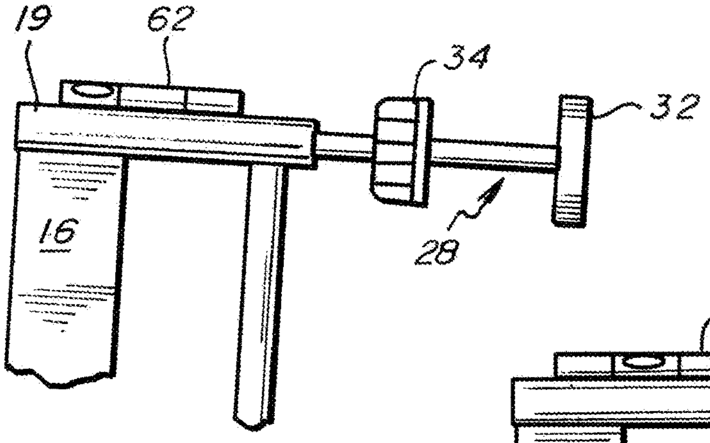
FIG. 14A is a detail view of the visual indicator apparatus of FIG. 14 showing that the oblique end frame portion is oblique and has not engaged the gate of the pressure gate apparatus.
Figure 14B:
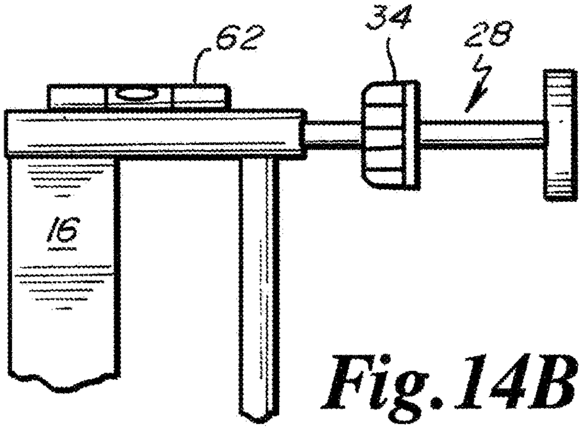
FIG. 14B is a detail view of the visual indicator apparatus of FIG. 14 showing that the oblique end frame portion is at a right angle relative to the threshold and has therefore properly engaged the gate of the pressure gate apparatus.

FIGS. 14, 14A, and 14B show a slightly different position for the bubble level visual indicator 62.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A pressurized gated barrier that is engaged between two opposing surfaces, comprising:

a) a frame;

b) the frame having a threshold;

c) the frame having a first standard extending upwardly from the threshold;

d) the frame having a second standard extending upwardly from the threshold;

e) a gate in the frame between the first and second standards;

f) the first standard being set at a right angle relative to the threshold;

g) the second standard being set at an oblique angle relative to the threshold at a first time, the second standard being set at a right angle relative to the threshold at a second time, the second standard being under pressure at the second time such that the gated barrier is a pressurized gated barrier; and h) a visual indicator apparatus on at least one of the second standard and gate that visually shows that the second standard has been set at a right angle relative to the threshold;

i) wherein the visual indicator apparatus includes a first structure disposed at a first location, the first structure engaged to the second standard;

j) wherein the visual indicator apparatus includes a second structure disposed at a second location, the second structure engaged to the gate;

k) the first location being offset from the second location at the first time;

l) the first location being aligned with the second location at the second time;

m) a latch apparatus engaged to one of the second standard and gate, the latch apparatus including a latch; and n) the visual indicator apparatus being spaced from the latch apparatus and latch, wherein the first structure includes a tongue with a mark and wherein the second structure includes a window, with the mark being offset from the window at the first time and with the mark being aligned with the window at the second time.

2. A pressurized gated barrier that is engaged between two opposing surfaces, comprising:

a) a frame;

b) the frame having a threshold;

c) the frame having a first standard extending upwardly from the threshold;

d) the frame having a second standard extending upwardly from the threshold;

e) a gate in the frame between the first and second standards;

f) the first standard being set at a right angle relative to the threshold;

g) the second standard being set at an oblique angle relative to the threshold at a first time, the second standard being set at a right angle relative to the threshold at a second time, the second standard being under pressure at the second time such that the gated barrier is a pressurized gated barrier; and h) a visual indicator apparatus on at least one of the second standard and gate that visually shows that the second standard has been set at a right angle relative to the threshold;

i) wherein the visual indicator apparatus includes a first structure disposed at a first location, the first structure engaged to the second standard;

j) wherein the visual indicator apparatus includes a second structure disposed at a second location, the second structure engaged to the gate;

k) the first location being offset from the second location at the first time;

l) the first location being aligned with the second location at the second time;

m) a latch apparatus engaged to one of the second standard and gate, the latch apparatus including a latch; and n) the visual indicator apparatus being spaced from the latch apparatus and latch, wherein one of the first and second structures includes a tongue with a mark and wherein the other of the first and second structures includes a window, with the mark being offset from the window at the first time and with the mark being aligned with the window at the second time.

* * * * *